(No Model.) 6 Sheets—Sheet 1.

A. MACAULEY.
CASH REGISTER.

No. 587,042. Patented July 27, 1897.

Fig. 1.

WITNESSES:
Harry M. Hyde
John A. Werner

INVENTOR.
Alvan Macauley.

(No Model.) 6 Sheets—Sheet 2.

A. MACAULEY.
CASH REGISTER.

No. 587,042. Patented July 27, 1897.

WITNESSES:
Harry M. Hyde
John A. Werner

INVENTOR.
Alvan Macauley.

(No Model.) 6 Sheets—Sheet 4.

A. MACAULEY.
CASH REGISTER.

No. 587,042. Patented July 27, 1897.

WITNESSES:
Harry M. Hyde
John A. Werner

INVENTOR.
Alvan Macauley.

(No Model.)

A. MACAULEY.
CASH REGISTER.

No. 587,042. Patented July 27, 1897.

WITNESSES:
Harry M. Hyde
John A. Werner

INVENTOR.
Alvan Macauley.

UNITED STATES PATENT OFFICE.

ALVAN MACAULEY, OF DAYTON, OHIO, ASSIGNOR TO THE NATIONAL CASH REGISTER COMPANY, OF SAME PLACE.

CASH-REGISTER.

SPECIFICATION forming part of Letters Patent No. 587,042, dated July 27, 1897.

Application filed September 23, 1896. Serial No. 606,719. (No model.)

*To all whom it may concern:*

Be it known that I, ALVAN MACAULEY, residing at Dayton, in the county of Montgomery, State of Ohio, have invented certain new and useful Improvements in Cash-Registers, of which the following is a description, reference being had to the accompanying drawings, forming a part of this specification.

The primary object of my invention is to combine with a registering mechanism a series of type-bars and type. It comprises a series of keys representing the letters of the alphabet and a second series of keys representing the digits. Each key of both series is provided with a type-bar and a type, and a carriage bearing a platen is arranged to retain a paper strip in position to receive impressions when the type are actuated by the keys in the manner of the ordinary typewriter. The keys representing the digits are, however, provided with means whereby when desired they are thrown into operative connection with the registering-wheels, by means of which any amount or number printed upon the paper strip by the type may be also added upon the registering-wheels, if desired.

To illustrate the use of my improved device, suppose the operator of the machine to be making out an itemized bill. It is written out just as on a type-writer; but before striking the keys printing the amount the operator moves a dial which throws the digit-keys into operative connection with the registering-wheels, and such amounts, besides being printed on the paper strip, are registered, as already described.

Referring to the drawings, Fig. 11 is a detail view of the dial.

The same numerals of reference in the several figures of the drawings indicate identical parts.

Referring to the drawings, it will be seen that I have shown my invention as applied, with such modifications as were necessary, to a well-known form of type-writer, and in order to show the novel parts more clearly some of the parts of the type-writer have been omitted from the drawings. For example, the platen and its adjustments are not shown in some views of the machine, and other features are not shown at all; but these parts and their various connections are shown and described in the patent to W. J. Barron, No. 463,934, dated November 24, 1891.

Figure 1:
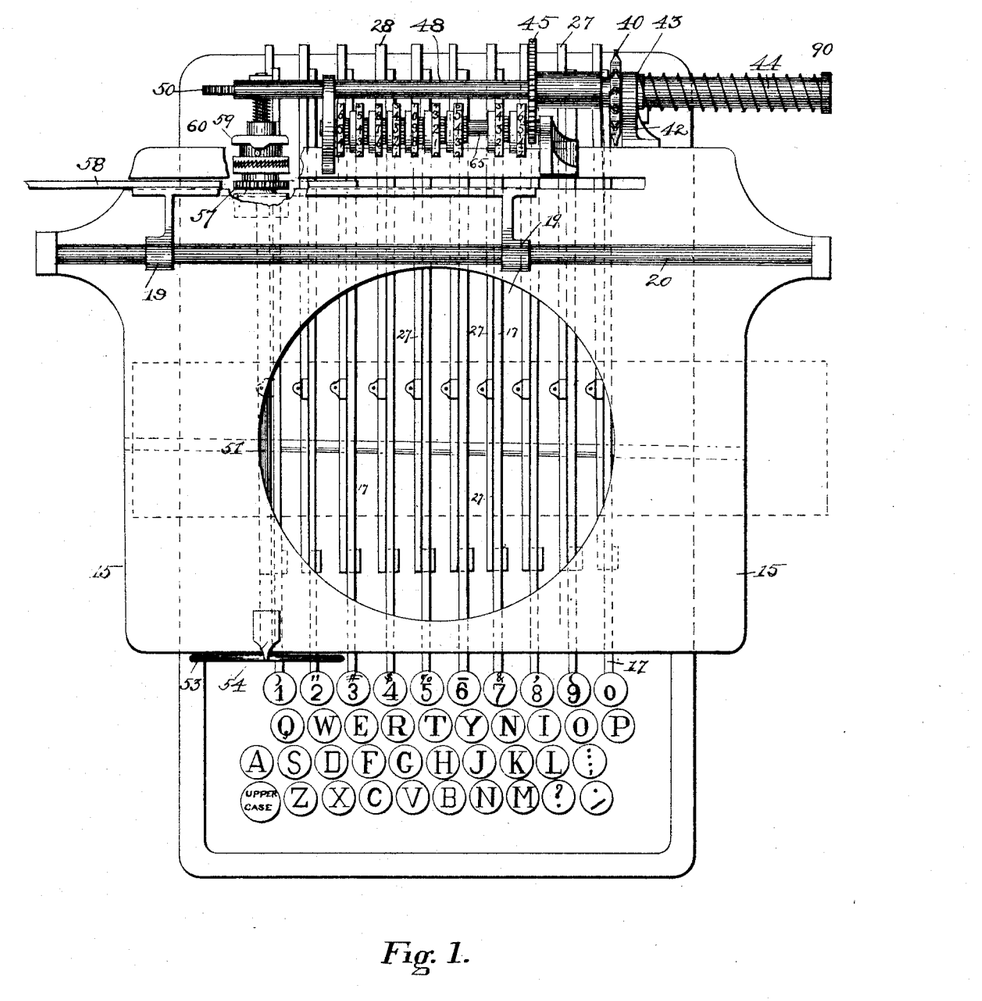
Figure 1 shows a top plan view of my device complete, with the exception that the carriage, platen, and coöperating devices for holding the paper are omitted in order to show the other parts to better advantage.
Figure 2:
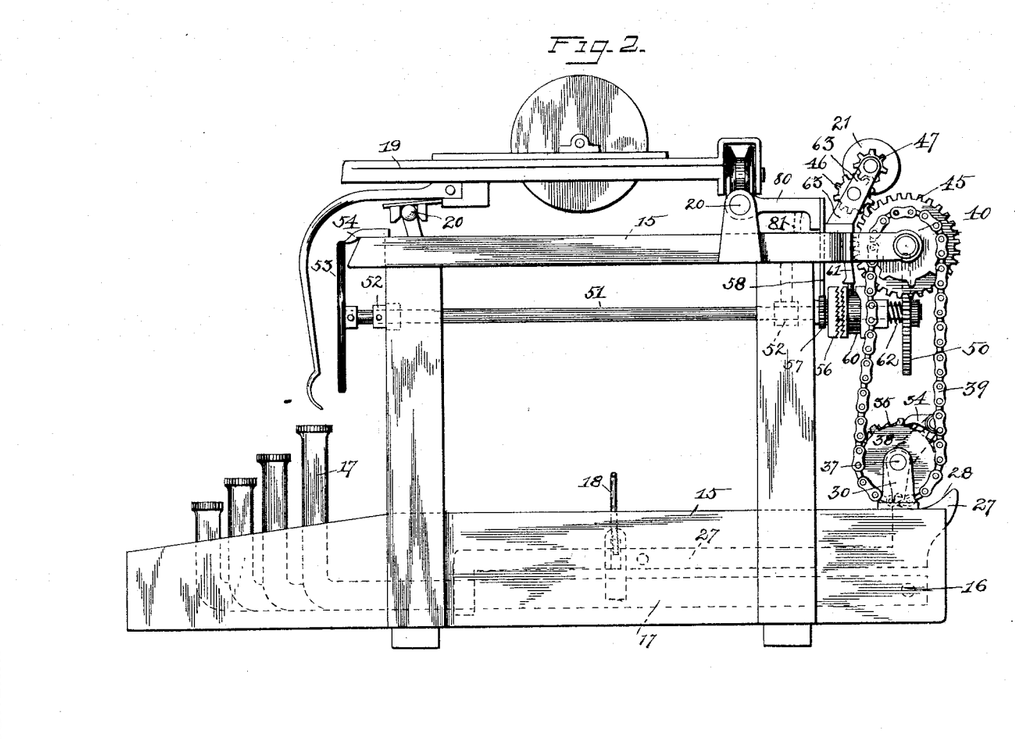
Fig. 2 shows a side elevation view of the device as illustrated in Fig. 1, but showing also the carriage and the platen.
Figure 2:
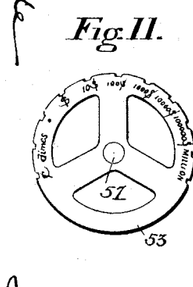

Referring now to the drawings, the number 15 indicates the main frame of the machine, in which, upon a transverse shaft 16, the keys 17 are pivoted. Each key is provided with a type-bar (not shown) which is connected with the respective key by means of the connecting-rod 18, only one of which is shown in the drawings. The carriage 19 is movable laterally on the ways 20 in the usual manner and carries the platen and its coöperating parts, as may be seen by reference to Fig. 2.

The arms 80, which carry the usual escapement-rack 81, are mounted upon the way 20, upon which run the rollers 82, which support the carriage 19, and it may readily be seen by reference to the patent to Barron before referred to that the carriage, the platen which is borne thereby, and the said escapement-rack are coöperative, in that in whatever direction one moves on the way 20 the others will simultaneously move in the same direction and to the same extent.

The counter, which is composed of the registering-wheels 21, 22, 23, 24, 25, and 26, is located above the top of the frame and just behind the carriage. It is actuated by a series of cams connected to the key-levers, as I shall presently describe. To each digit-key is connected a cam-bar 27, and upon its rear end each cam-bar carries a key-cam, forming thus a series of nine key-cams. These cams are graduated—that is, the angle of inclination of the operating-surface 28 of each one varies from all the rest—the inclination of the operating-surface of the cam on the "1" key being least, the others increasing successively and by a constant increment up to the "9" key, the inclination of the operating-surface of which is just nine times that of the "1" key. In a similar manner the inclination of the "5" key is just five times that of the "1" key, &c. The horizontal transversely-extending registering-board 29 is pivoted at its end in upright supports 30. Its lower edge is provided with a series of slots 31, and a rod 32 passes horizontally through the lower edge, forming bearings for the key-cams 28. Near its right-hand-end the registering-board is provided with a pawl-arm 33, carrying a pawl 34, which coöperates with a ratchet 35, which is carried by the sleeve 36, which is mounted and turns on the trunnion 37 of the registering-board. The lower sprocket 38 is also secured upon the sleeve 36, and the sprocket-chain 39 connects the lower sprocket with the upper sprocket 40, which is carried upon the left-hand end of the hub 41, which revolves within fixed bearings formed in the bracket 42, secured to the main frame 15. A collar 43 is secured upon the right end of the hub, which carries the upper sprocket to retain the latter in proper position. Sliding within the hub 41 and having a spline-and-feather connection therewith is a long sleeve 44, upon the left-hand end of which is secured the driving-gear 45, which actuates the registering-wheels through the intermediate gears 46, which are in constant mesh with the registering-gears 47.

Fitting and arranged to slide within the sleeve 44 is a driving-gear shaft 48, upon the under side of which, at the left-hand end, is formed the rack 49, which engages with a vertical gear 50, which is secured upon the rear end of and is carried by the dial-shaft 51, which turns in the bearings 52 and upon the front end of which is secured the dial 53, coöperating with which is a spring-pointer 54, which is arranged to engage successively in the notches in the periphery of the dial-wheel to hold the dial-shaft, the gear 50, and the rack 49 at any desired point. The compression-spring 55 encircles the sleeve 44 and bears at one end against the hub 41, which is fixed against longitudinal movement, and at the other against the ring 90, which is fixed upon the right-hand end of the sleeve 44. The said spring therefore exerts normally a pressure tending to hold the sleeve, and consequently the gear 45, carried thereby, in normal position and to return said gear to normal position when displaced therefrom.

Figures 4, 5, 6:
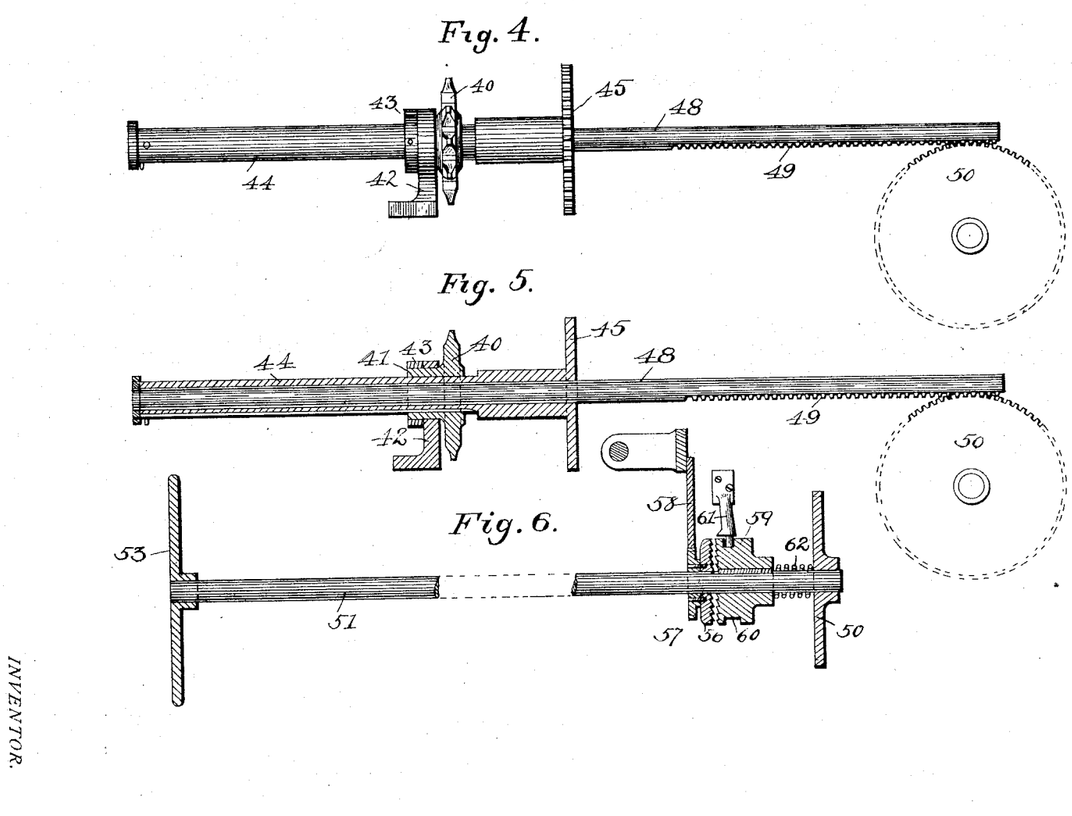
Fig. 4 shows an enlarged detail elevation view of the driving-shaft and some of the parts coöperating with it.
Fig. 5 is a vertical sectional view of the parts shown in Fig. 4.
Fig. 6 is a detail view, partly in section, showing the dial, the clutch, and the rack which is secured to and carried by the escapement-rack which controls the movement of the carriage.

Mounted loose upon the dial-shaft, between the bearing 52 and the gear 50, is one member 56 of a clutch which is carried by a gear 57, that is in constant mesh with the rack 58, which is secured to the escapement-arms 80, which move with carriage 19. In practice of course the rack 58 is secured far enough back of the escapement-rack 81 to avoid any interference with said escapement-rack or its coöperating elements. The second clutch member 59 is splined upon the dial-shaft and is provided with an annular groove 60, (shown in Figs. 2 and 6,) which has a narrowed portion normally on the top side, into which projects a stud 61, which is fixed to the main frame 15, by means of which the clutch members are normally held out of engagement; but when the dial is turned the widening of the annular groove 60 permits the second clutch member 59 to be forced into engagement with the clutch member 56 by the compression-spring 62, all for a purpose which I shall presently describe.

Figure 3:
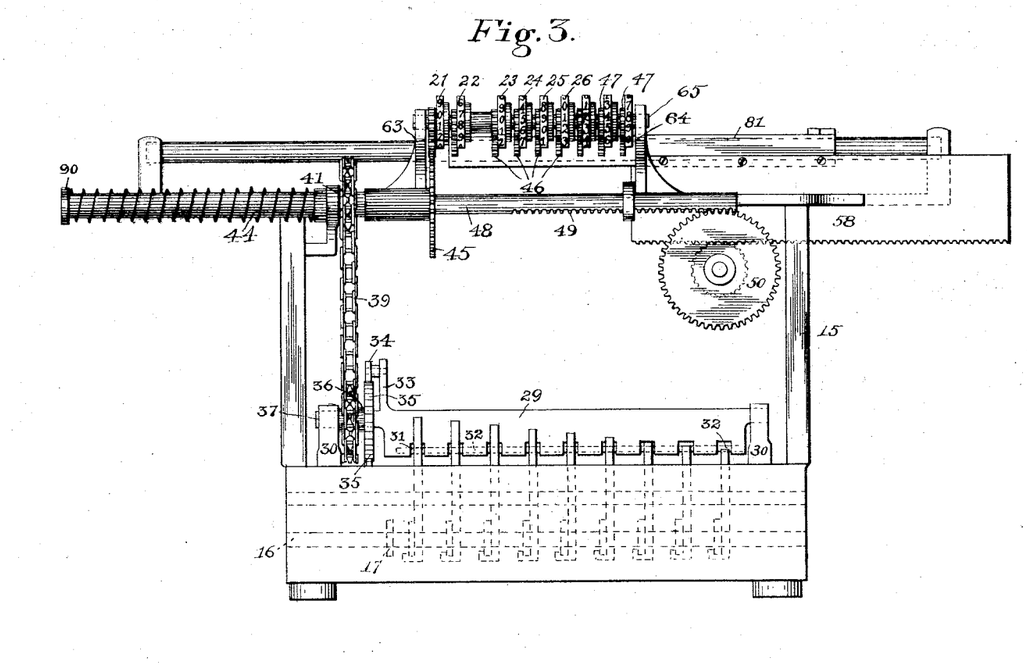
Fig. 3 shows a rear elevation of the device as shown in Fig. 1.

The letter-keys are not changed or added to in any way. When they are operated, the carriage moves successively, step by step, from the right-hand end of the ways 20 toward the left in the usual manner. The clutch member 56 is loose on the dial-shaft and turns with each movement of the carriage, being actuated by the rack 58. So long as the dial is permitted to remain in normal position the machine may be used just as any typewriter, and both letter and numeral keys may be operated without in any manner affecting the registering-wheels of the counter. Sometimes, however—as, for instance, when making out itemized bills—it is highly desirable that the number of amounts be automatically added into a total, so that when the bill has been completely written out the bookkeeper or other operator may simply glance at the registering-wheels and from them get the exact total amount of all the items without any calculation. To this end the dial-plate is provided with a "no-adding" notch, in which the pointer 54 rests when the machine is in use only as a type-writer. For use as a cash-register it is provided with a "cents" notch, a "dimes" notch, a "period" notch, a "dollars" notch, a "tens-of-dollars" notch, a "hundreds-of-dollars" notch, &c., according to the number of registering-wheels. Suppose now, for example, I desire to register an amount of "$150.62." As this amount is in hundreds of dollars, I turn the dial toward the left until the pointer 54 rests in the "hundreds-of-dollars" notch. This turns the dial-shaft correspondingly to the left, and the clutch member 59 is thrown into mesh with the clutch member 56 by the spring 62; but the inclination of the teeth of the clutch members is such that they slide over each other when the dial-shaft is turned to the left, but engage as soon as movement of the dial-shaft ceases. The continued movement of the dial turns the gear 50, which is fast upon the dial-shaft, to the left, and the gear being in engagement with the rack 49 draws the shaft 48 and the gear 45 to the left also. When the dial is moved so that the pointer is in engagement with the "hundreds" notch, the gear 45 will be moved to the left to engage the intermediate gear 46 of the "hundreds" registering-wheel 25, as may be seen by reference to Fig. 3 of the drawings. If, for example, the dial were moved so that the pointer should engage in the "10c." notch the gear 45 would be moved into engagement with the intermediate gear which actuates the "ten-cent" registering-wheel 22. Therefore, in registering the amount above referred to, "$150.62," the dial is first properly set, which throws the driving-gear 45 into mesh with that one of the intermediate gears which actuates the "hundreds-of-dollars" registering-wheel 25. The "1" key is then struck, which actuates the "1" key-cam to register "1" on the "hundreds-of-dollars" registering-wheel. Simultaneously the type-writer carriage moves one notch to the left in the usual manner. This movement of the carriage is instantly transmitted by means of the rack 58 to the dial-shaft, because the clutch is in mesh. From the dial-shaft the movement is transmitted, through the gear 50 and the rack 49, to the shaft 48, and finally to the gear 45, which being thus released the compression-spring is permitted to act, which it does instantly, moving said gear 50 to the right into engagement with the next—that is, the "tens-of-dollars"—registering-wheel. The intermediate mechanism between the carriage 19 and the gear 45 is so proportioned that the extent of movement of the carriage is just sufficient to permit the gear 45 to be moved the proper distance. Then the "5" key is struck and in a similar manner "5" is recorded on the "tens-of-dollars" registering-wheel, while the gear 45 moves again to the right into engagement with the "dollars" registering-wheel 23; but there are no odd dollars in the amount "$150.62," which I have assumed is to be registered, so I strike the "0" key, which it will be noticed by reference to Fig. 3 is provided with no key-cam, so the carriage moves another step to the left without affecting the registering-wheels, and as the distance between the "dimes" registering-wheel and the "dollars" registering-wheel is just twice that between any other two successive registering-wheels the gear 45 comes to a stop midway between the intermediate gears which actuate the "dimes" wheel and the "dollars" wheel, respectively. The carriage and the gear 45 being thus at rest, I strike the key which prints the period to mark the decimal, whereupon the carriage moves another step to the left and the gear 45 moves into engagement with the intermediate gear which actuates the "dimes" registering-wheel 22. I now strike the "6" key and the amount "6" is properly registered on the "dimes" registering-wheel, whereupon the gear 45 moves again to the right into engagement with the intermediate gear which actuates the "cents" registering-wheel 21, when the "2" key is pressed and the entire amount "$150.62" will be found recorded on the registering-wheels.

The movement of the digit-keys is transmitted to the registering-wheels in the following manner: When the digit-key is pressed, its cam 27 is raised and its operating-surface 28 immediately contacts with the lower end of the swinging board, and as the downward movement of the key is continued the operating-surface of the key-cam moves upward and turns the swinging board 29 on its trunnions a distance depending upon the numerical value of the particular key operated. This movement is transmitted from the registering-board to the sprocket-wheel 38 by the pawl 34, which is carried on the pawl-arm 33 and which actuates the ratchet 36, which is sleeved to the said sprocket-wheel. From the sprocket-wheel 38 the movement is transmitted through the sprocket-chain to the upper sprocket-wheel 40, which, as already described, is splined to the sleeve 44, which carries the gear 45. Thus the movement is transmitted directly from the upper sprocket-wheel 40 to the gear 45, which transmits it, through the intermediate gear 46, to the gear 45, which actuates the registering-wheel, as already described.

The compression-spring 55, by exerting a pressure tending to return the gear 45 to normal position, operates to make the said gear quickly responsive to the movement of the carriage, so that when the latter is released by a key and moves to the right the clutch member 56 is thereby turned partially, but stops when the movement of the carriage is checked by the escapement mechanism. Now, as I have said, the compression-spring, in exerting a pressure tending to move the driving-gear 45 to the right, tends also to move the driving-gear shaft 48 in the same direction, and consequently to turn the gear 50, the dial-shaft 51, the dial 53, and the clutch member 59, which is splined upon the dial-shaft, from which it will be readily understood that whenever the carriage moves it releases the dial-shaft, and consequently the gear 45, whereupon the compression-spring draws the said gear to the right until the carriage is checked by the escapement mechanism, when the clutch member 56 becomes rigid, and as the clutch member 59 is in engagement therewith it too becomes rigid, thereby stopping the dial-shaft, the gear 50, the driving-gear shaft 48, and in turn the driving-gear 45, which is of course left in a position of engagement with one of the registering-wheels.

Figure 7:
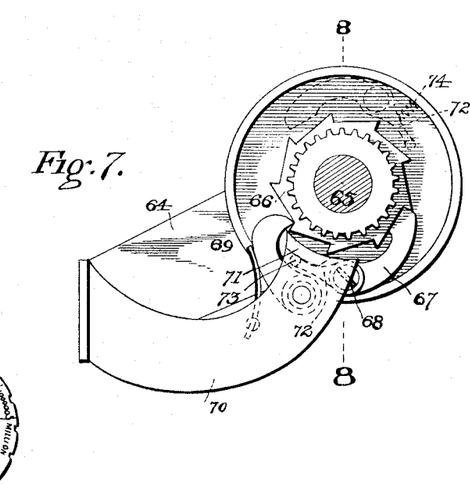
Fig. 7 is an enlarged view in section through the counter-wheels on the lines 7 7 of Fig. 8.
Figure 8:
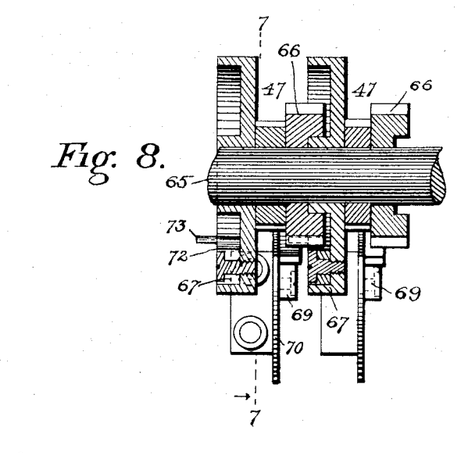
Fig. 8 is a transverse vertical section on the lines 8 8, Fig. 7, through two of the counter-wheels and their coöperating parts.
Figure 9:
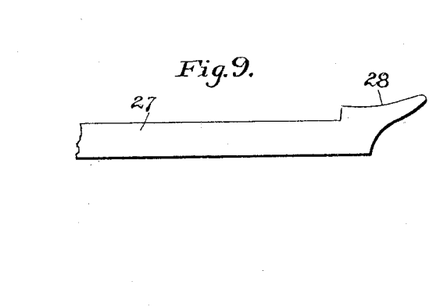
Fig. 9 is a detail view of one of the key-cams.
Figure 10:
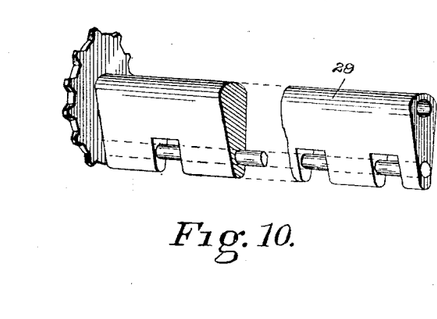
Fig. 10 is a similar view of the swinging board which actuates the sprocket-wheel secured thereon at one end.
Figure 12:
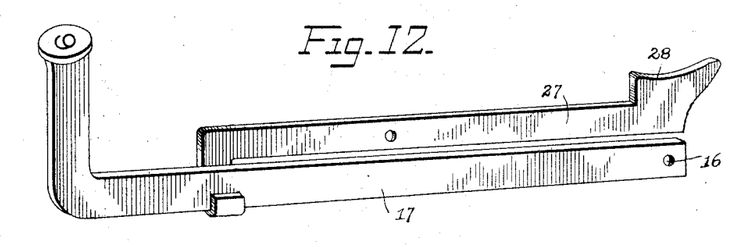
Fig. 12 is a detail view in perspective showing a key and the cam-bar carrying the key in operative connection therewith.
Figure 13:
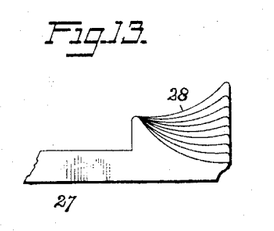
Fig. 13 shows an end view, looking from left to right, of the graduated series of nine key-cams.
Figure 14:
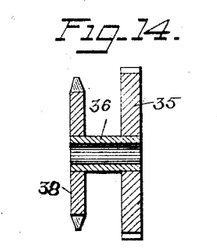
Fig. 14 is a detail sectional view showing the ratchet-wheel which is actuated by the swinging board, the sprocket-wheel, and the sleeve upon which they are fixed.

The counter, comprising the series of registering-wheels 21, 22, 23, 24, 25, 26, &c., is mounted in vertical arms 63 64, which are secured to the main frame 15. The registering-wheels are mounted on the counter-shaft 65 and each is undercut or recessed, as will be seen by reference to Figs. 7 and 8, and in the recesses thus formed lies the ratchet 66, also journaled on the counter-shaft. The transfer-pawl 67, which is pivotally secured to its respective registering-wheel, is normally out of engagement with the ratchet, as is shown in broken lines in Fig. 7. Rigidly secured to each registering-wheel on the right-hand side and carried thereby is a gear 47, and the ratchet 66 is in turn secured to and carried by the said gear. The said gear receives the movement from the keys through the intermediate gears 46 and transmits it directly to the registering-wheels, any reverse movement thereof being prevented by the retaining-pawl 69, which is pivoted upon a transfer-arm 70, which is fixed to the main frame 15, and one of which coöperates with each adjacent pair of registering-wheels to effect the transfer of an amount from the wheels of lower denomination to the next higher.

The manner in which the transfer is effected will be presently described. Each transfer-arm is provided at its outer end with a lateral projection 71, which operates as a cam in connection with the transfer-pawl 67. The latter is provided with a tail 72, upon the rear end of which is secured a pin 73, which projects to the right in a direction parallel to the counter-shaft 65, as is shown in broken lines in Figs. 7 and 8.

The operation of the registering-wheels is as follows: When a key is pressed, its value is transmitted, in a manner already described, through the intermediate gear 46, to the gear 47, which, being secured directly to and carrying its registering-wheel, therefore transmits the value of the operated key directly to the latter. When the registering-wheel has made a complete revolution, it of course returns to zero position and transmits "1" to the adjacent wheel of higher denomination, and this is accomplished in the following manner: The transfer-pawl 67 is pivoted to its registering-wheel and is normally held out of engagement with its ratchet-wheel 66 by means of a small compression-spring 74. Said ratchet-wheel is, however, loose with respect to the revolution of the registering-wheel to which its coöperating pawl is secured, so that during the successive movements of the registering-wheel from "0" to "9" the registering-pawl is held in a disengaged position. (Shown in broken lines in Fig. 7.) At the instant, however, that the registering-wheel passes the "9" mark the pin 73, which is carried by the tail of the transfer-pawl, will engage over and ride upon the cam 71, which is carried by the transfer-arm, thereby throwing the transfer-pawl into engagement with its ratchet, whereby the registering-wheel during its movement from "9" to "0" position will carry the ratchet with it, and thereby, since said ratchet carries the registering-wheel of next higher denomination, it will advance the latter one notch. When, however, the registering-wheel of lower denomination reaches zero position, the pin 73 will have passed completely over the cam 71, whereupon the spring 74 will immediately throw the transfer-pawl out of engagement with the ratchet, and the pawl will not be again engaged till the registering-wheel has again reached the "9" notch.

For ordinary use my device is operated in a manner usual to type-writers, as already described. Should, however, it be desired to register an amount—say, for example, five cents—I move the dial-plate till the pointer engages the "cents" notch, which causes the clutch-members to engage, thereby throwing the registering-wheels into operative connection with the key-cams. I then strike the "period" key, which prints that character upon the paper sheet in the platen. I next press the "0" key, which likewise prints that character upon the paper strip, but registers nothing, as neither the "period" nor the "0" key is provided with a key-cam. Finally I press the "5" key, which prints that character also on the paper sheet and properly records that amount on the "cents" registering-wheel, whereupon the clutch members are automatically disengaged and the counters are thrown out of operative connection with the key-cam in the manner before described. When the dial-plate is turned, the clutch-member 56, being loose on the dial-shaft, is not affected, but the clutch member 59, being splined upon the dial-shaft, turns with it, and the wide part of the annular slot 60, being moved to the fixed stud 61, permits the compression-spring 72 to instantly throw the clutch member 59 forward into engagement with the clutch member 56. The gear 50, being fast upon the dial-shaft and engaging the rack 49, moves the gear 45 into engagement with the proper registering-wheel, as already described. Then when the desired digit-keys are operated the amount is duly recorded upon the registering-wheels, and the gear 50 is moved backward step by step toward normal position. The clutch member 59 simultaneously turns back toward normal position, and as the stud enters the narrowed portion of the annular groove 60 the clutch members are forced apart and become disengaged when the gear 50 reaches normal position.

I claim—

1. In a device of the class described the combination with the digit-keys, of the registering-wheels, a longitudinally-movable non-revoluble transverse shaft, a sleeve movable on the shaft, a gear carried by the sleeve and arranged to engage the registering-wheels, means for moving the sleeve and the gear longitudinally on the non-revoluble shaft, and independent means for revolving the sleeve and the gear carried thereby.

2. In a device of the class described the combination with the digit-keys, of the registering-wheels, a gear carried by a sleeve on a transverse shaft and arranged to engage the registering-wheels, a sprocket splined upon the sleeve, a registering-board actuated by the keys and means for transmitting the movement of the said board to the said sprocket.

3. In a device of the class described the combination with the movable platen arranged to carry the paper, and the registering-wheels, of the keys, shiftable mechanism arranged to transmit the movement of the keys to the registering-wheels, shifting means arranged to throw said mechanism into operative engagement with said registering-wheels, and devices for automatically throwing the shiftable mechanism out of operative engagement.

4. In a device of the class described the combination with the series of keys, of a single platen arranged to move laterally a determined distance at each operation of any one of the keys, of the registering-wheels, normally-disengaged driving means connecting the keys and the registering-wheels, mechanism normally disengaged for transmitting the movement of the platen to a shiftable member of the driving means, and devices for simultaneously throwing the driving means into engagement with the registering-wheels, and the shiftable member of said mechanism into engagement to be moved with the platen.

5. In a device of the class described the combination with the series of keys, of a single platen arranged to move a determined distance at each operation of any one of the series of keys, of the registering-wheels, normally disengaging driving means connecting the keys and the registering-wheels, mechanism normally disengaged for transmitting the movement of the platen to a shiftable member of the driving means and a clutch and coöperating devices for simultaneously throwing the driving means into engagement with the registering-wheels, and engaging the shiftable member of said mechanism so that the latter will be moved with the platen.

6. In a cash-register the combination of the registering-wheels, driving means operating to transmit the movement of the keys to the registering-wheels, a normally-disengaged clutch, manually-operated means for setting the clutch, and means controlled by the clutch for shifting a member of the driving means into operative engagement to actuate the registering-wheels.

7. In a device of the class described the combination, of the registering-wheels, driving means operating to transmit the movement of the keys to the registering-wheels, a transverse shaft bearing a gear, a rack formed upon one side of the transverse shaft, and a pinion coöperating therewith, substantially as described.

8. In a device of the class described the combination with the platen, of the registering-wheels, driving means operating to transmit the movement of the keys to the registering-wheels, and a rack and pinion controlled by the movement of the platen and coöperating with a clutch, substantially as described.

9. In a device of the class described the combination with the platen and the registering-wheels, of the dial-shaft, the rack movable with the platen, the pinion carrying the clutch member 56 turning on said shaft, and meshing with said rack, the clutch member 59 splined upon the dial-shaft and arranged to engage the first-mentioned clutch member, and the gear 50 arranged to engage the rack of the drive-shaft 48 whereby said drive-shaft may be moved transversely by turning the dial-shaft.

10. In a device of the class described the combination with the registering-wheels, of the dial-shaft, the rack movable with the platen and actuating the clutch member 56, the clutch member 59 splined upon the dial-shaft, the gear 50 fixed upon the dial-shaft and actuating the drive-shaft 48, and the gear 45 arranged to drive the registering-wheels.

11. In a device of the class described the combination with the platen and the registering-wheels of the rack movable with the platen and actuating the clutch member 56 loose upon the dial-shaft, the clutch member 59 splined upon said shaft, so that when the clutch members are in engagement the dial-shaft will be turned whenever the platen moves, the gear 50, fixed upon and carried by the dial-shaft, the shaft 48 bearing the rack engaged by the gear 50, the gear 45 carried by the sleeve 44, which turns upon the said shaft 48, the upper sprocket-wheel 40 splined upon the sleeve, and means for transmitting the movement of the keys to said sprocket-wheel.

12. In a device of the class described the combination with the platen, the keys, and the registering-wheels, of the rack actuating the clutch member 56 loose upon the dial-shaft, the clutch member 59 splined upon said shaft and arranged to engage the first-mentioned clutch member, the gear 50 fixed upon and carried by the dial-shaft and engaging the rack carried by the shaft 48, the gear 45 loose upon said shaft, the key-cams actuated by the keys and means for transmitting movement from the key-cams to the said gear 45.

13. In a device of the class described the combination with the platen having a determinate movement, and the registering-wheels, of the rack 58 movable with the platen and meshing with the pinion 57 carrying the clutch member 56, turning loose upon the dial-shaft 51, the clutch member 59 splined upon said shaft and held normally disengaged from the first-mentioned clutch member, the gear 50, fixed upon the dial-shaft and engaging the rack 49 carried by the shaft 48, the gear 45 turning upon said shaft 48, the sprocket 40 splined upon the sleeve of the said gear 45, the chain 39 connecting the said sprocket with the lower sprocket 38, which turns with the ratchet 35, which is actuated by the pawl 34 carried on the arm 33, which is actuated by the registering-board.

14. In a device of the class described, the combination with the registering-wheels, the registering-board, and means for transmitting movement from the said board to the registering-wheels, of the keys, of the cam-bars, each having an operative connection with the keys at one end and bearing a key-cam at the other arranged to transmit the movement of the respective keys to the cam-bar, substantially as described.

15. In a device of the class described, the combination with the registering-wheels, the registering-board, and means for transmitting the movement of the said board to the registering-wheels, of the keys, and the bars each bearing a cam at one end which is arranged to coöperate with the registering-board, and having at the other end a hook arranged to engage the adjacent key, substantially as described.

ALVAN MACAULEY.

Witnesses:
  JOSEPH P. CLEAL,
  IRA BERKSTRESSER.